April 9, 1935. L. L. ARBUCKLE 1,997,035
AGITATOR FOR MILK PRODUCTS
Filed Aug. 20, 1932 2 Sheets-Sheet 2
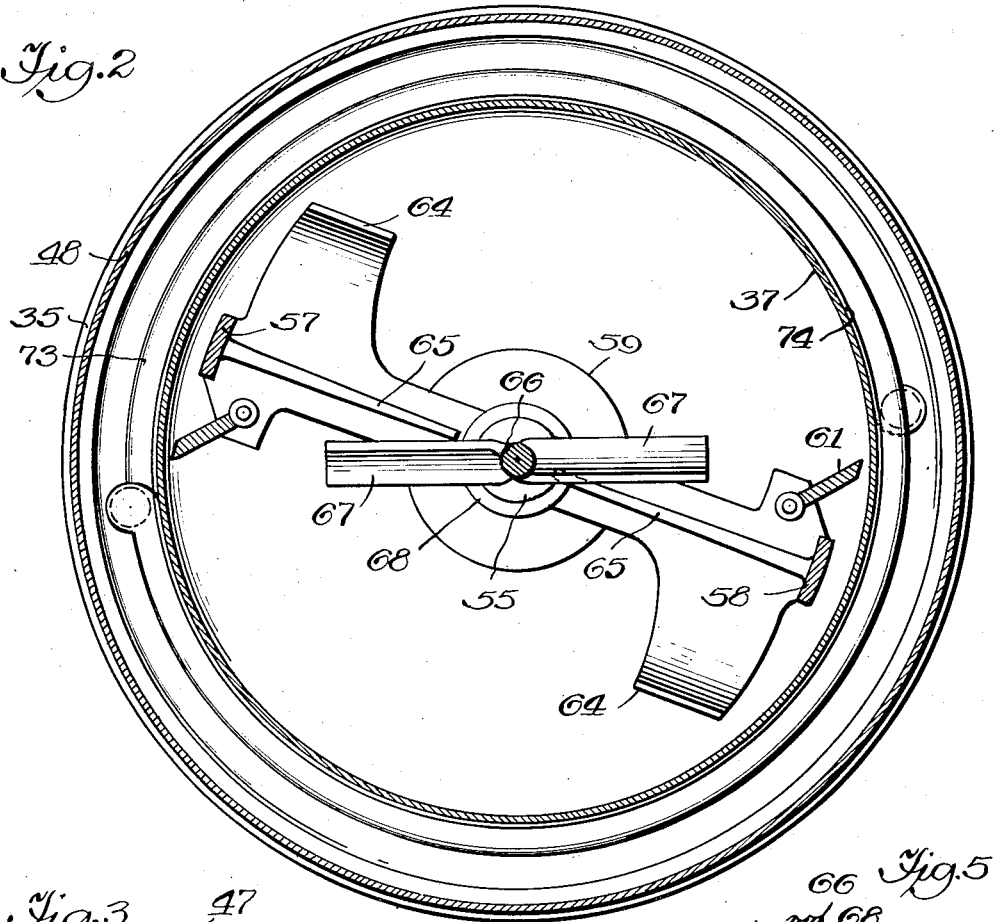
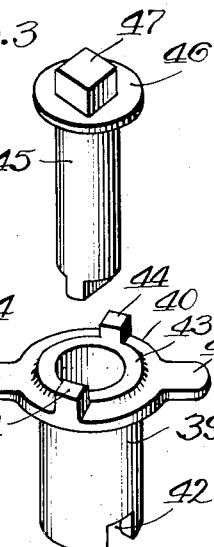
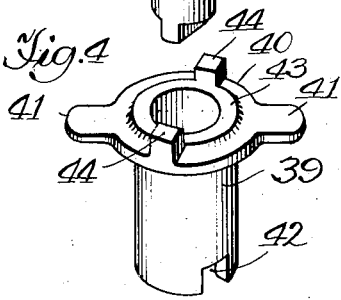
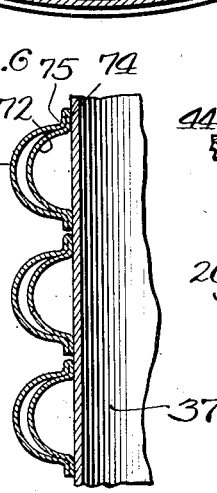
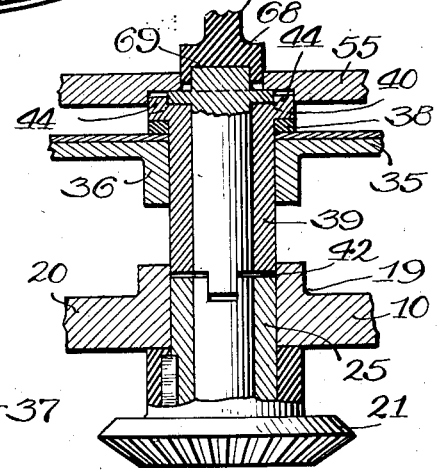
Witness
Chas. R. Koursh.
Inventor,
Lawrence L. Arbuckle,
Benj. D. Fordhouse Atty.

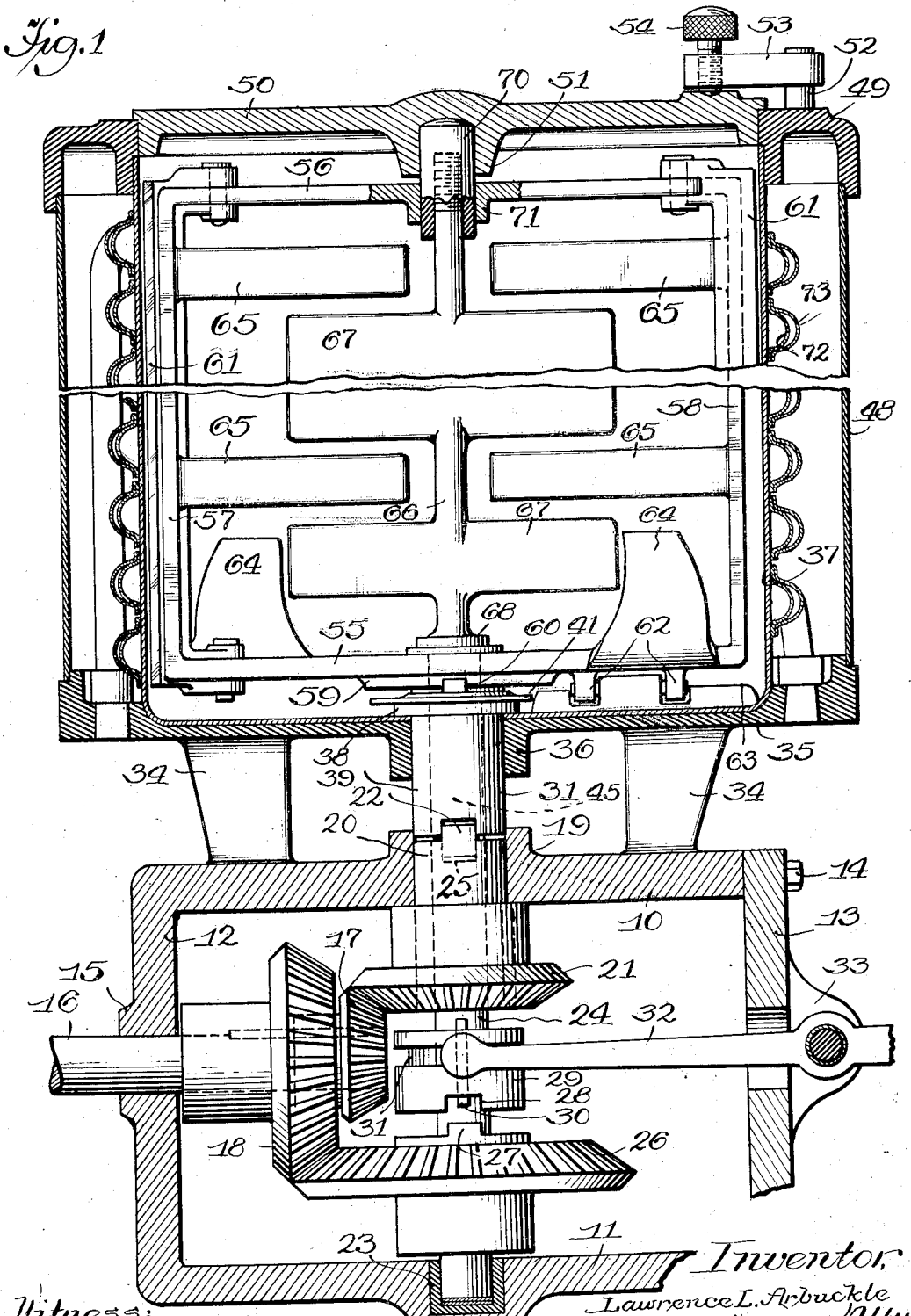

Patented Apr. 9, 1935

1,997,035

UNITED STATES PATENT OFFICE 1,997,035

AGITATOR FOR MILK PRODUCTS

Lawrence L. Arbuckle, Chicago, Ill., assignor of one-half to Julius I. Corn, Chicago, Ill.

Application August 20, 1932, Serial No. 629,588

2 Claims. (Cl. 259—105)

My present application relates to improvements in apparatus for the use in the production of milk products. It is already well known that ice-cream of a superior excellence can be produced when the elements going into its composition are agitated or beaten as they are being frozen, and like advantageous results may be secured in the preparation of other milk products by agitation while they are being heated. All products containing milk must be kept scrupulously clean and the apparatus for the production of such products should be designed and constructed so as to permit of the easy and complete cleansing and sterilization of all portions thereof which come in contact with the milk. It has generally been found desirable to provide a scraper in connection with ice-cream freezers for removing the portions of the product which adhere to the walls during the progress of the freezing in addition to the necessary elements for beating the product. A scraper is equally, if not more, necessary in apparatus in which the milk is heated for preventing the formation of an adhering layer or pellicle of the product against the side of the container. Such a scraper works most advantageously when not rotated too rapidly, whereas the elements that do the beating of the product can advantageously be rotated at a greater rate of speed.

It is highly desirable to delay the beating of the product until after preliminary chilling or heating has been accomplished, as beating at that stage of operations merely delays the chilling or heating. The action of the scraper, however, is peculiarly necessary during a preliminary chilling or heating for it is at this time that portions of the product are most likely to adhere to the walls of the chamber in which the operations are being performed.

As will hereafter be seen, I have provided a helical passageway around the chamber for the circulation of the cooling medium which has peculiar advantages in the economy of construction and in operation as it facilitates the ready passage of heat through the container wall and discourages the passage of heat through other portions of the passage.

In the provision of my present apparatus I have had in mind the production of a mechanism, all parts of which contact the milk, may be quickly and completely cleaned and sterilized, and I have also had in mind the production of a device in which I am able to control the operation of the heaters independently of the operation of the operation of the scraper.

I have attained the aforementioned objects by means of the structure illustrated in the accompanying drawings, in which—

Fig. 1 is a central vertical section through a structure embodying my present invention.

Fig. 2 is a horizontal section through the heat transfer portion of the device on line 2—2 of Fig. 1.

Fig. 3 is a perspective detail of the coupling member for driving the beater shaft.

Fig. 4 is a perspective detail of the coupling member for driving the scraper frame.

Fig. 5 is an assembly view showing the coupling members in their operative relations.

Fig. 6 is a cross sectional fragmental detail showing the construction of the channel for the cooling or heating medium.

Similar reference characters have been employed for designating similar parts throughout the respective views.

The power applying means are mounted within a framework comprising an upper plate 10 and a lower plate 11 held in parallel and spaced relation by an integral vertical side plate 12 and an opposite detachable vertical side plate 13 which is held in suitable relation to the top and bottom plates by means of the machine screws or bolts 14. Centrally of the vertical side plates 12 is a centrally bored embossment 15 which forms a journal for a shaft 16, the outer end of which may be connected in any desired way with a suitable source of power such as an electric motor (not shown). To the inner end of the shaft 16 are keyed a pair of beveled gears 17 and 18, the beveled gear 17 located at the end of the shaft 16 being of smaller diameter than the beveled gear 18.

Centrally of the top plate 10 is a bored embossment 19 forming the journal or bearing for a hollow or bored shaft 20 upon the lower end of which is keyed a beveled gear 21 meshing with the beveled gear 17. The upper end of the shaft 20 is provided with the upstanding lugs 22.

Centrally of the lower plate 11 and aligning with the bore in the tubular shaft 20 is a recess 23 which forms a bearing for the lower end of the shaft 24, the top of which extends to about the top of the tubular shaft 20 and is provided with a transverse slot 25.

Rotatably mounted upon the shaft 24 is the beveled gear 26 meshing with the beveled gear 18. The hub of the beveled gear 26 is provided with the upstanding lugs 27 which co-operate with recesses 28 in a clutch collar 29 co-operatively related with the shaft 24 by means of a feather or spline and a slot or splineway 30 provided in the shaft 24. The clutch collar 29 is provided with an annular channel 31 with which co-operates the arms of a bifurcated lever 32 pivoted upon a suitable bracket 33 extending from the plate 13. It will, of course, be understood that the clutch collar 29 is for the purpose of controlling the transmission of movement from the beveled gear 26 to the shaft 24.

Arising from the top plate 10 are a suitable number, three or more, posts or columns 34 which are either integral or suitably connected with the base or supporting plate 35 of or for the heat transfer compartment. Centrally of the plate 35 is a depending tubular or bored embossment 36, the bore whereof aligns with the bore in the embossment 19. Disposed concentrically upon the top of the plate 35 is preferably a spun metal container 37, centrally perforated to register with the bore in the embossment 36. Soldered or sweated or otherwise suitably secured about the central perforation is an annulus 38, the upper face whereof may be easily lapped or ground to secure a true surface which will fit and substantially seal with the part with which it co-operates. The part with which the annulus 38 co-operates is a tubular shaft 39, shown in detail in Fig. 4, which has an extended annular head 40, the under face of which is also ground or lapped to rest upon and fit with the upper face of the annulus 38.

Ears 41 extend from the annular head 40 so as to permit of its easy removal from the annulus 38 and the bore in the embossment 36. The lower end of the tubular shaft 39 is provided with opposite recesses 42 to receive the lugs 22 upon the tubular shaft 20. Surrounding and adjacent the central opening in the annular head 40 is a slightly raised annular bearing 43 outside of which upon the annular head 40 are provided the oppositely disposed upstanding lugs 44.

Extending through the bore in the tubular shaft 39 is the solid shaft 45 carrying adjacent its upper end the annularly extending flange 46, the lower face of which rests upon the bearing surface 43. Extending above the flange 46 is the angular, or as shown rectangular, projection 47. Concentric with the vertical walls of the metal container 37 and spaced therefrom and supported by the plate 35 is the exterior casing 48 of the heat transfer compartment. Securing together the upper ends of the walls of the container 37 and exterior casing 48 is the annular top head 49 into the central opening of which fits a cap or closure 50, provided with a central hollow embossment 51. The closure may be secured in place in any desired way such as is shown by stud bolt 52, arm 53 and set screw 54, a suitable number of these devices being spaced about the annulus 49.

Mounted within the spun metal container 37 is a rectangular scraper frame comprising a lower horizontal member 55, an upper horizontal member 56, the opposite ends whereof are connected by vertical members 57 and 58. Centrally of the lower horizontal member 55 of the scraper frame is a bore or perforation slightly larger than the annular flange 46 of the shaft 45, and depending from the lower face of the member 55 is an embossment 59 in which is provided slots or apertures 60 for the receipt of the studs 44 of the tubular shaft 39. Pivoted to the horizontal members 55 and 56 of the scraper frame and extending parallel with the vertical members 57 and 58 of this frame are the scrapers 61. Also pivoted to the bottom horizontal member 55 of the scraper frame from depending lugs 62 are scrapers 63 for moving the product from the bottom of the container 37.

I have also shown extending upwardly from the lower horizontal member 55 of the scraper frame upwardly and backwardly curved blades 64 which assist in the movement of the product. Extending laterally and inwardly from the vertical members 57 and 58 of the scraper frame are blades 65. The scraper frame and all the parts carried thereby are rotated at a relatively slow speed through the co-action of the small beveled gear 17 with the somewhat larger beveled gear 21.

A beater shaft 66 is disposed centrally of the container 37. This beater shaft 66 is provided with laterally extending blades 67 alternating in vertical disposition with the blades 65 extending from the scraper frame. The lower end or foot 68 of the beater shaft 66 has a socket 69, most clearly shown in Fig. 6 of an angular shape to co-operate with the angular projection 47 of the shaft 45. The top of the beater shaft 66 is threaded to receive a tapped tubular or cylindric cap 70, the upper end of which enters the bore in the embossment 51 and passes through the bore in a central depending embossment 71 provided in the upper horizontal member 56 of the scraper frame.

As will be seen from an inspection of Fig. 1 I have left a slight space between the tops of the tubular shaft 20 and shaft 24 and the bottoms of tubular shaft 39 and shaft 45 so that any thrust or vertical movement imparted to the lower shafts will not be transmitted to the upper shafts to disturb the seating of the flanged heads 40 and 46 upon their respective supports. The assembly of the scraper frame with the lugs 60 and the assembly of the beater shafts 66 with the angular head 47 is sufficiently loose so that any lateral play in the scraper frame or beater shaft will also leave the seating of the flanges 40 and 46 undisturbed. The ground seats of these flanges will prevent the escape of any appreciable amount of the contents of the container 37 therefrom and any such escape of the contents will be in a direction to prevent the contamination of the product in the container 37.

It will be seen that when it is desired to cleanse and sterilize the parts not only can the scraper frame and the beater shaft, but also the shafts 45 and 39, be easily removed from the container and quickly and completely sterilized.

For causing a suitable circulation of a cooling or heating medium about the spun metal container 37, I roll a ribbon or band or tube of a suitable metal, the most available and practical from an economic point of view being, at present, copper, into the spaced semi-cylindrical loops 72 and 73 with the registering lateral flanges 74 and 75, as shown in detail in Fig. 6. The metal thus formed is disposed in a helix about the spun metal container 37 and the flanges 74 and 75 are soldered or sweated or otherwise suitably secured thereto.

Such a construction is not only simple and economical, both in material and labor, but also leaves between the heating or cooling medium in the channel and the product to which heat is to be added or from which heat is to be extracted only the thickness of the wall of the chamber 37 for conduction to take place. The walls of the channel through which the heating or cooling medium is circulated, other than that provided by the wall of the chamber for the product, contain an air chamber of such size as to prevent substantial circulation of the air therein which provides a most effective insulator against the conduction of heat through said walls. Such a circulating chamber is not only good for use with any kind of heating fluid but also for cooled brine, and has peculiar advantages in connection with the use of a vaporizable cooling medium where the construction has to stand a change of pressure as the juncture between the flanges and the walls of the container add materially to the strength of the structure as a whole and to its several parts.

Having described my invention what I claim as new and desire to secure by Letters Patent is:

1. In combination a cylindrical chamber, a rectangular scraper frame disposed within said chamber, scrapers pivotally mounted upon said frame, agitator blades extending from said scraper frame toward the axis of rotation thereof, a beater shaft rotatably mounted in the axis of rotation of said scraper frame, beater blades extending laterally therefrom and alternately with respect to the blades carried by said scraper frame, a tubular shaft, a shaft mounted therein, means for rotating said tubular shaft, clutch controlled means for rotating said interior shaft, and removable sealing elements extending through the walls of said chamber and establishing couplings with longitudinal play between said tubular shaft and included shaft respectively with said scraper frame and beater shaft.

2. In combination a cylindrical vertically disposed container having a perforation in the center of the bottom thereof, a washer with a ground upper face mounted within said container about said perforation, a tubular shaft extending through said perforation, a laterally extending annular head upon said tubular shaft, the under face whereof is ground and co-operates with said washer, said lateral flange having an annular ground path upon its upper face, a shaft mounted within said tubular shaft, a lateral head upon said last mentioned shaft, the under face whereof is ground and co-operates with said ground annular path, a scraper frame detachably associated with the cap of said tubular shaft, a beater shaft detachably associated with said interior shaft, means engaging with the lower end of said tubular shaft having longitudinal play with respect thereof for rotating it in one direction and independently controlled means engaging with said interior shaft having longitudinal play with respect thereto for rotating it in an opposite direction.

LAWRENCE L. ARBUCKLE.